United States Patent [19]

Weil et al.

[11] 4,169,362
[45] Oct. 2, 1979

[54] SOLID ADSORPTION AIR CONDITIONING APPARATUS

[75] Inventors: Sanford A. Weil, Chicago; William F. Rush, Arlington Heights; Jaroslav Wurm, N. Riverside; Raymond J. Dufour, Wheaton, all of Ill.

[73] Assignee: Institute of Gas Technology, Chicago, Ill.

[21] Appl. No.: 921,780

[22] Filed: Jul. 3, 1978

Related U.S. Application Data

[62] Division of Ser. No. 780,693, Mar. 24, 1977, Pat. No. 4,121,432.

[51] Int. Cl.$^2$ .................. F25B 17/02; F25B 17/08
[52] U.S. Cl. ......................................... 62/478; 62/480
[58] Field of Search ............... 62/79, 101, 478, 480, 62/119, 514 R

[56] References Cited

U.S. PATENT DOCUMENTS

| Re. 5,287 | 2/1873 | Carre | 62/478 |
|---|---|---|---|
| 992,560 | 5/1911 | Heuser | 62/478 |
| 1,467,053 | 9/1923 | Mach | 62/478 |
| 1,790,757 | 2/1931 | Miller | 62/79 |
| 2,659,215 | 11/1953 | Massopust | 62/480 |
| 2,871,674 | 2/1959 | Koivisto et al. | 62/480 |
| 3,411,318 | 11/1968 | Puckett | 62/478 |

Primary Examiner—Lloyd L. King
Attorney, Agent, or Firm—Thomas W. Speckman

[57] ABSTRACT

A solid adsorption air conditioning apparatus for cooling and heating which is compact in size and particularly adapted to low capacity and which may be at least partially solar powered and air cooled. The apparatus utilizes water vapor as refrigerant working within a hermetically sealed module. The hermetically sealed module has opposing thermally conductive walls which are internally coated with water vapor adsorbent material and thermally insulated from each other. The water vapor working fluid is desorbed from the adsorbent on the interior of a first side by heating while removing heat from the opposing second side causing the working fluid to adsorb in a condenser function at the second side and then applying heat to the second side while removing heat from the first side causing the working fluid to desorb from the second side and adsorb at the first side functioning as an adsorber while the second side is functioning as an evaporator and recycling said thermal condition sequence to provide desired conditioning to an air conditioned space.

9 Claims, 8 Drawing Figures

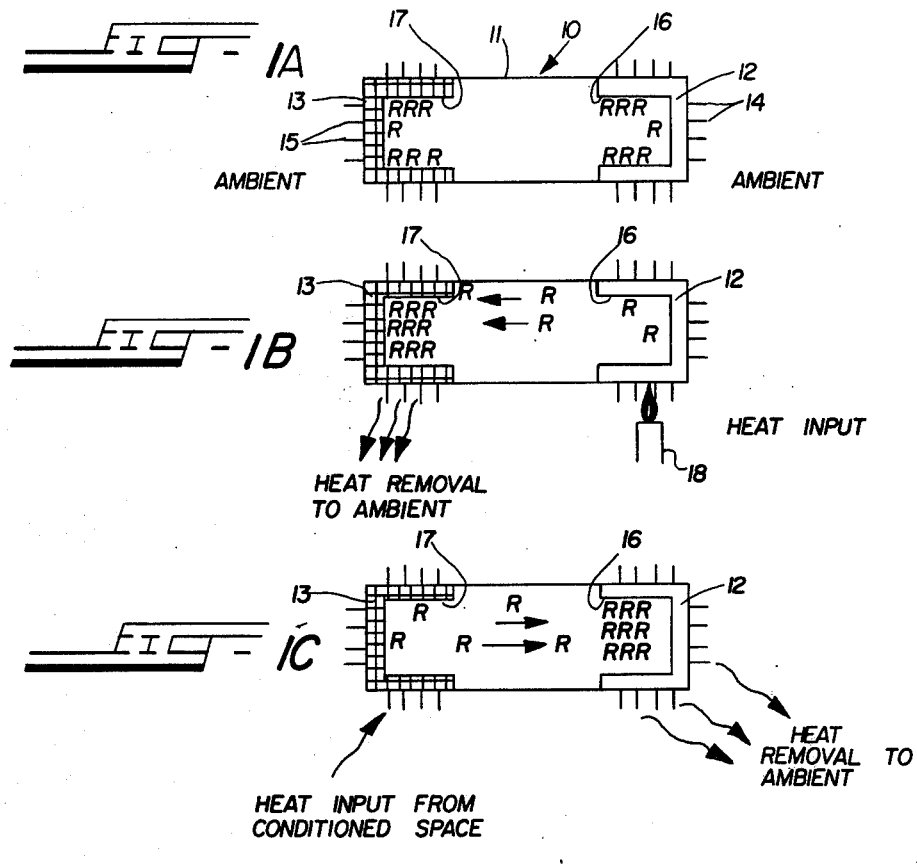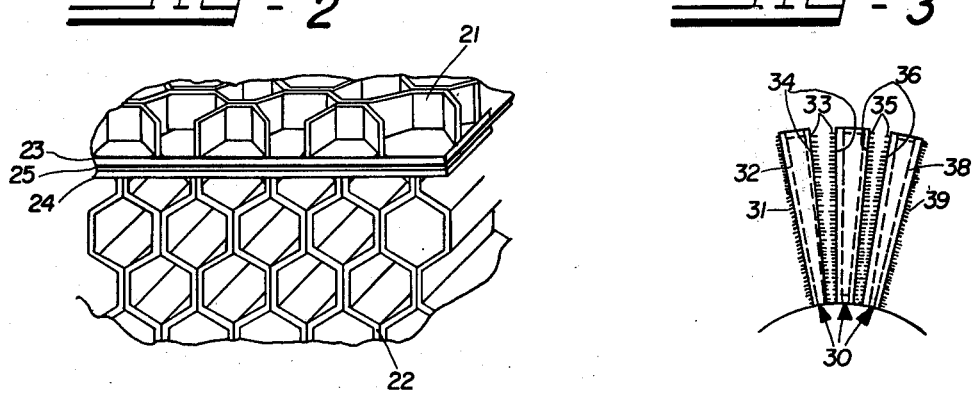

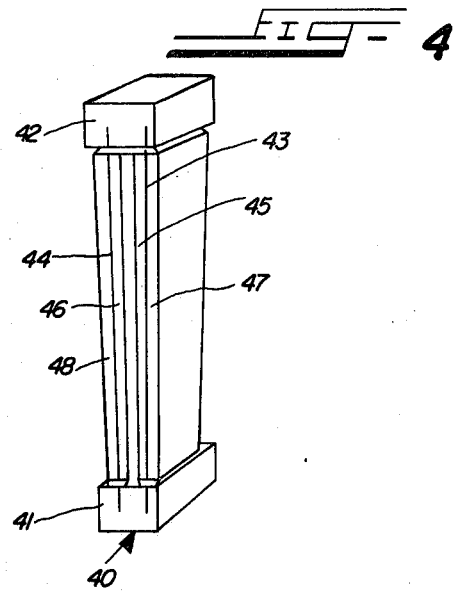
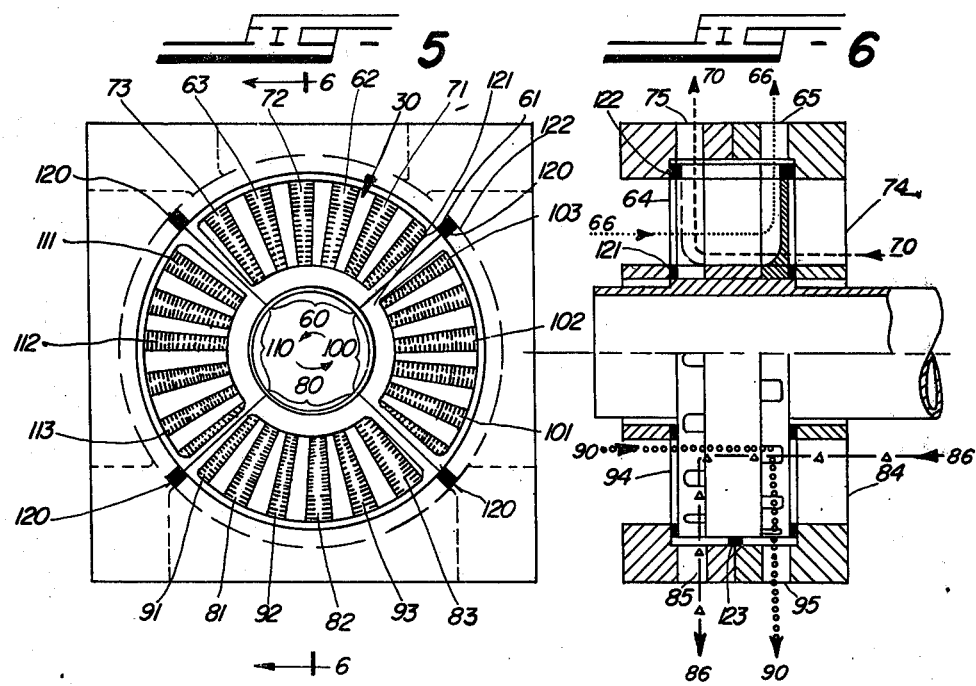

SOLID ADSORPTION AIR CONDITIONING APPARATUS

This is a division of application Ser. No. 780,693, filed Mar. 24, 1977 now U.S. Pat. No. 4,121,432.

This invention relates to a solid adsorption air conditioning apparatus particularly adapted to low capacities, about 3 tons and less rated at standard air conditioning conditions. Throughout this specification and appended claims, cooling refers to obtaining temperatures normally associated with comfort control. It is also desired that such low tonnage capacity cooling apparatus be compact and at least partially solar powered and air cooled.

The work of Michael Faraday in 1824 described a solid absorbent system wherein ammonia gas was absorbed on silver chloride. The ammonia-silver chloride was heated at one end of a sealed tube while the opposite end of the tube was cooled and liquid ammonia was produced at the cool end. Cooling was then produced by vaporization of the liquid ammonia. (Modern Electric and Gas Refrigeration, Andrew D. Althouse and Carl H. Turnquist, Third Revised Edition, The Goodheart-Willcox Company, Inc., 1939, pages 56-60). The present invention uses an adsorbent at both ends of a hermetically sealed chamber, does not require a phase change and has refrigerant transport entirely in the gaseous phase.

In view of the trend toward smaller residences, more apartments, and various attempts to lower energy consumption by use of architectural features and additional insulation, the need for low tonnage capacity cooling device is becoming important in the residential market for air conditioners. The production of such a low tonnage capacity cooling device which eliminates the need for water cooling of the absorber and condenser and allows ambient air to be used instead is desirable. With recent developments toward energy saving design and use of higher insulation, the need for an air cooled cooling unit of about 1 ton cooling capacity is important.

Presently available heat actuated cooling apparatuses are limited to a nominal capacity of about two and a half tons. It is difficult to produce smaller capacity units while reducing their physical size.

The apparatus of this invention provides an air cooling and heating apparatus which utilizes a Class I refrigerant, even enabling through-the-wall installation. The apparatus of this invention does not require liquid handling components, does not require a secondary refrigerant loop and has a potential Coefficient of Performance that is as high or higher than other presently available heat actuated cooling devices, such as absorption air conditioners.

It is an object of this invention to provide an air cooled, low tonnage capacity cooling apparatus and process especially suitable for small or energy conserving residences.

It is another object of this invention to provide a cooling and heating apparatus and process which may utilize solar heat for a substantial portion of its energy input requirements.

It is yet another object of this invention to provide a cooling and heating apparatus and process not requiring any liquid handling.

It is another object of this invention to provide a single, compact apparatus which may be easily changed from a cooling to heating function by simple duct damper.

These and other objects and advantages will become apparent to one skilled in the art upon reading the following description and reference to the figures showing preferred embodiments wherein:

FIG. 1A schematically shows a hermetically sealed module according to this invention with both ends at ambient temperature and showing an equal amount of internal working fluid at each end;

FIG. 1B shows the same module as shown in FIG. 1A with heat applied to one end to provide a temperature gradient resulting in a concentration gradient of the internal working fluid;

FIG. 1C shows the same module as shown in FIG. 1A in the cooling mode wherein heat removal at one end provides a concentration gradient of the internal working fluid resulting in a temperature gradient and heat input at the other end;

FIG. 2 shows a cutaway perspective view of one embodiment of internal and external extended surfaces for a hermetically sealed module wall according to this invention;

FIG. 3 shows one embodiment of three hermetically sealed modules according to this invention;

FIG. 4 shows a perspective schematic view of a preferred embodiment of a hermetic module according to this invention;

FIG. 5 shows a side schematic view of one embodiment of a solid adsorption air conditioning apparatus according to this invention; and FIG. 6 shows a sectional view along the line indicated in FIG. 5.

Referring to FIGS. 1A through 1C, hermetically sealed container 10 has one end portion 12 and opposite end portion 13 separated by central portion 11. End portion 12, central portion 11 and opposite end portion 13, comprise a hermetically sealed container capable of retaining working fluid molecules indicated by the symbol R. The inside of end 12 is coated with adsorbent 16 and the inside of end 13 is coated with adsorbent 17. These adsorbents may be the same or different materials. It is preferred that adsorbents 16 and 17 provide a high surface area which may be achieved by use of extended surfaces on the interior of ends 12 and 13. Likewise, to improve thermal transfer from the working fluid molecules to air streams flowing past the outside of ends 12 and 13, it is desired to use exterior extended surfaces 14 and 15, respectively. As shown in FIG. 1A, both ends are at ambient temperature, the working fluid is at a steady state, that is the amount of refrigerant designated by the letters R adsorbed on adsorbent 16 at end 12 and adsorbed on adsorbent 17 at end 13 is stable since both ends are at ambient temperature. When a different adsorbent is used at each end, the amount of working fluid adsorbed at each end when both ends are at ambient temperature, may be different. FIG. 1B shows an external heat source 18 supplying heat to end portion 12 of hermetically sealed container 10. During heating of end 12, opposite end 13 is maintained substantially cooler by thermal transfer to an ambient airflow. Central portion 11 serves as a thermal insulator between end 12 and opposite end 13. The differential temperature condition within the hermetically sealed container creates a thermal gradient between the ends tending to drive the working fluid to adsorbent 17 at cooler opposite end 13. This thermal gradient condition is continued until the desired transfer of working fluid to opposite end 13 is achieved. Heat input source 18 may then be removed and end 12 cooled by thermal transfer to an ambient temperature airflow. A concentration gradient in the opposite direction will then exist and an unsteady state with respect to the working fluid will then exist within the hermetically sealed container. The working fluid will then tend to move toward and readsorb at end 12. The vaporization of working fluid from end 13 creates a cooling effect in the space to be cooled by the heat input to end 13 from the conditioned space to be cooled. When this step is completed, the working fluid is adsorbed at end 12 and the cycles illustrated in FIGS. 1B and 1C can be continued in an alternating cyclic fashion.

By alternately having end 12 function as a generator and adsorber, and end 13 function alternately as a condenser and evaporator, a cooling effect is obtained at end 13. To obtain the desired cooling effects, the temperature excursions at the evaporator-condenser end may vary from between about 40° to about 110° F. while the generator-adsorber end may vary from about 110° to about 325° F. In view of these temperature changes described with respect to the schematic presentation of FIGS. 1A-1C, design of the hermetically sealed container as well as heat recuperation becomes important to make the process practical and energy conservative.

FIG. 2 shows one preferred embodiment for the provision of extended surfaces on both the interior and exterior of the hermetically sealed module wall to provide for a large surface area of adsorbent and efficient heat thermal transfer from the working fluid molecule to an exterior airstream. The structure shown in FIG. 2 also provides a structurally strong wall for a hermetically sealed module, especially in view of the axes of the interior and exterior honeycomb being at right angles. The embodiment shown in FIG. 2 uses aluminum honeycomb structure 21 as the primary heat transfer surfaces located on the interior of the hermetically sealed module and honeycomb structure 22 as the secondary thermal exchange surface located to the exterior of the hermetically sealed module. These honeycomb structures have their open core axes at right angles, the honeycomb structure on the interior of the hermetically sealed module having the axes at approximately right angles to the wall of the hermetically sealed module, while the honeycomb structure to the exterior of the module or the secondary thermal transfer surfaces, have their axes approximately parallel to the wall of the hermetically sealed module. The primary thermal exchange surface 21 is attached to the interior of hermetically sealed module wall 25 in thermal exchange relationship by fastening means 23 and the secondary thermal exchange surface 22 is attached to the exterior of wall 25 by fastening means 24. It is desired that the fastening means used between the thermal exchange surfaces and wall 25 are as thermally conductive as possible as is wall 25 to maximize the thermal exchange between the primary and secondary thermal exchange surfaces.

Any suitable high surface area structure having high thermal conductivity may be used to provide the extended surfaces for the primary and the secondary thermal exchange surfaces. Metallic, or at least partially metallic structures, are preferred. Wire structures or any shape multi-tubular structures are satisfactory so long as they provide large surface area, thermal conductivity and structural strength. It is preferred that sufficiently large passageways are maintained by the secondary surfaces to provide a low pressure drop upon passage of the thermal exchange air.

FIG. 2 shows a preferred embodiment utilizing aluminum honeycomb structures produced by American Cyanamid Company under the trademark "DURA-CORE" and having a hydraulic diameter of about 1/16 inch, single wall thickness of 0.00135 inch, free-flow area 0.95 sq. ft. per sq. ft., area density of 721 sq. ft. per cubic ft. and matrix density of 8.966 lbs. per cubic ft. As shown in FIG. 2, aluminum sheet 25 may be bonded to aluminum honeycombs by use of adhesive films 23 and 24 which may be epoxyphenolic adhesives having a metallic filler, such as aluminum. There are a number of suitable bonding agents known to the art containing over 50% metallic filler and reinforcement is possible utilizing metallic fibers. Another preferred embodiment would be to have an aluminum wall having aluminum extended surfaces on both sides in direct contact with the aluminum wall, such as obtained by brazing.

A suitable adsorber for the primary thermal exchange surfaces at the opposite ends of the hermetically sealed module may be any chemical providing water vapor adsorption properties and regeneration at relatively low temperatures. Lithium chloride, lithium bromide, natural zeolites and various molecular sieves are suitable and may be applied to the extended surfaces by methods known in the art. Particularly preferred adsorbents are crystalline zeolites or molecular sieves which provide desired adsorption and desorption properties with respect to water vapor.

The zeolite adsorbents used in this invention may include natural crystalline zeolites, such as stilbite, or synthetically produced crystalline metal alumino-silicates known as molecular sieves, activated for adsorption by removing their water of hydration. Molecular sieves belong to the class of compounds known as zeolites, but this latter term is also inclusive of both gel-type amorphous alumino-silicates commonly referred to as zeolites (used as water softeners), and of the crystalline zeolites used in this invention. The amorphous type do not exhibit selectivity based on molecular size.

The unit cell of the crystalline zeolites of this invention have a unit cell formula of $M_{2/n}O.Al_2O_3.xSiO_2.yH_2O$ where M is a cation of n valence. The fundamental group in each unit cell, the smallest repetitive entity in the crystalline material, is a tetrahedra of four oxygen anions surrounding a silicon or alumina cation with the metal cation making up the positive charge deficit in each alumina tetrahedra. Among the over 40 commercial zeolites availabe, we prefer the 3-A, 4-A, 5-A, 10-X, and 13-X types. The 4-A type has a unit cell formula of $Na_{12}[(AlO_2)_{12}(SiO_2)_{12}].27H_2O$, in which two alumina and two silica tetrahedra link to form a rigid compact group. The latter links with other identical groups to form a cubic cell having a ring aperture on each face, the diameter of this aperture being 4 A, hence the designation 4-A. The central adsorption cavity of the cube has a volume of about 925 $A^3$, which is occupied by the water of hydration which can be driven off by heat. The water enters and leaves through the aperture. About $10^9$ unit cells comprise a cubic crystal in the powder form which measures about $1\mu$ along an edge, but which may be as large as $2\mu$, and can agglomerate with others to form a particle of size about $10\mu$ in size. Some penetration twinning type crystals range up to $30-40\mu$ in size.

Of the 12 Na cations in type 4-A, six are located at the pore openings partially blocking them and the remainder are located on the interior of the cube. Any or all of these Na cations can be exchanged with other metal cations, for example by potassium to give an aperture of 3 A, hence the designation 3-A for this type. Type 5-A is formed by exchanging the 12 Na cations with an equivalent of calcium cations, six in number, which locate on the inner face of each cell leaving the apertures unrestricted, of size 4.2 A. Type 13-X has the unit cell formula $Na_{86}[(AlO_2)_{86}(SiO_2)106].276H_2O$, while the 10-X type has an effective ring diameter of about 8 A. All these types have bulk density of about 30 lbs./cu.ft. for powders in the 1-10µ size range.

Especially preferred are types 4 A and 13 X.

The attachment of the molecular sieve to the extended metallic surface in a manner which results in uniform deposition, minimal masking of the adsorbent activity and of suitable strength and a suitable mechanical strength to withstand the operating conditions, has been developed as part of this invention. Coating the extended metallic surfaces with molecular sieves by multiple dipping requires metallic surface preparation, preconditioning followed by coating with multiple dipping. The surface preparation involves dipping the structure in a degreasing solution, such as 12 wt. percent NaOH in water, thorough water washing and removal of water by acetone or other organic chemical wash and thermal drying. The preconditioning of the surface is obtained by dipping the metallic structure into a solution of 2 parts of $Na_2SiO_4$ in about 23 parts of water. The preconditioning enhances the homogeneity of the final coating, especially at the edges of the extended surface filaments. After the preconditioning, the metallic structure is dried in a vacuum oven at about 100° C. The molecular sieve coating is applied by dipping the preconditioned metallic structure into a suspension of about 2 parts by weight of molecular sieve powder, about 1 part by weight of $Na_2SiO_4$ and about 16 parts by weight of water. The coated structure is dried in a vacuum oven at about 120° C. To increase the coating, the dipping process is repeated.

FIG. 3 shows one preferred embodiment for the arrangement of hermetically sealed modules 30. Adjacent modules have adjacent sides performing the same function, that is, primary evaporative surfaces 34 and secondary evaporative surfaces 33 are on adjacent walls of adjacent modules 30. A single airstream serves for thermal transfer of adjacent secondary evaporative surfaces 33. Likewise, primary adsorber surfaces 36 and secondary adsorber surfaces 35 are located on adjacent walls of adjacent modules. A single airstream can serve for thermal transfer with respect to the secondary adsorber surfaces of adjacent modules. Likewise, primary adsorber surface 32 and secondary adsorber surface 31 and primary evaporator surface 38 and secondary evaporative surface 39 are similarly arranged.

FIG. 4 shows schematically one embodiment of a preferred hermetic module according to this invention. One side of the module 40 is an adsorber surface and the other side an evaporator surface, each having a highly conductive metallic wall separated from each other by a highly insulating central wall portion. The hermetically sealed chamber is formed by impermeable walls 43 and 44 having high thermal conductivity, top insulating separator 42 and bottom insulating separator 41. Impermeable metallic wall 43 has primary extended surface 45 which is coated with suitable adsorbent inside the hermetically sealed chamber and secondary extended surface 47 on the outside of the hermetically sealed chamber, extended surfaces 45 and 47 being in thermal exchange relationship through wall 43. Likewise, opposing impermeable thermally conductive wall 44 has extended surfaces 46 on the interior of the hermetically sealed chamber and secondary extended surfaces 48 on the exterior of hermetically sealed chamber in thermal transfer relationship.

The hermetically sealed modules having their opposing primary extended surfaces coated with suitable adsorbent, one to function as an evaporator-condenser primary surface and the other to function as an adsorber-generator primary surface is charged with a suitable amount of working fluid. Water vapor is a suitable working fluid to use in the apparatus and process of this invention. Water vapor is especially suited due to its high latent heat and its non-toxic properties. To obtain higher efficiencies, the hermetically sealed chamber is evacuated to absolute pressures less than about $1 \times 10^{-3}$ mm Hg, preferably less than about $1 \times 10^{-4}$ mm Hg to remove the presence of non-condensables and to provide for introduction of a controlled amount of working fluid. The design and materials of construction must be consistent with the pressure level.

The individual hermetically sealed modules with their internal working fluid may be arranged in various manners to perform the cycle schematically set forth in FIGS. 1A–1C described above. A preferred configuration is to form a drum with the modules so arranged that adjacent sides of two modules serve the same function and can thus provide thermal transfer with a single airstream as schematically shown in FIG. 3. FIGS. 5 and 6 show one embodiment of a solid adsorption cooling apparatus according to this invention. It will become apparent as this description proceeds that different shaped modules and modifications of ducting may be used to achieve the same thermal transfer relationships as to be described. The specific shapes and patterns of flow are shown for exemplary purposes only.

FIG. 5 shows the front view of a preferred cooling apparatus according to this invention, having multiple hermetically sealed modules 30, as previously described with respect to FIG. 3, mounted on a rotating drum. The positions of the modules are divided into four functional zones; zone 60 for evaporating and adsorbing, zone 80 for condensing and generating, and zones 100 and 110 form heat recovery zones. Each of these four zones is separated by radial seals 120 which are located on front and rear stators. Suitable inner peripheral seal 121 and outer peripheral seals 122 are mounted on front and rear stators to provide confined airflow through passages between the modules. Peripheral seal 123, as shown in FIG. 6, serves to divide the airflow leaving adjacent passages. As shown in FIG. 5, the wheel carrying hermetic modules 30 rotates counterclockwise through the four zones in a continuously repeating basis. The wheel should have a rotational speed of about ½ to 5 revolutions per minute, about 1 to about 2 being preferred. Although the zones are shown as equal in size in FIG. 5, the size of each zone is determined by the necessary thermal relationships between the zones.

The stream of air 66 to be cooled enters the front stator through ducting means 64 so as to proceed through air channels 61, 62 and 63 exiting from the apparatus at ducting means 65 to the space to be cooled. The condition of the module surfaces adjacent air passages 61, 62 and 63 is similar to end 13 as shown in FIG.

1C functioning as an evaporator. Likewise, the condition of the opposite walls of the modules adjacent air passages 71, 72 and 73, is similar to end 12 as shown in FIG. 1C where it functions as an adsorber. Ambient airstream 70 enters through rear stator ducting means 74 into passages 71, 72 and 73, passing in thermal relationship with the adjacent modules providing heat removal to the ambient atmosphere at exit channel 75.

The modules previously within evaporating and adsorbing zone 60 are moved to preheating zone 110 wherein warm air from pre-cooling zone 100 is passed through alternate air channels 111, 112 and 113 preheating the module surfaces. The preheating airflow is passed to preheat zone 110 from pre-cooling zone 100 in a closed loop ducting means.

The modules continue counterclockwise rotation to generator-condenser zone 80 wherein heat input stream 86 enters through suitable ducting means 84 in rear stator to pass channels 81, 82 and 83 and exit from ducting means 86. The condition of module surfaces adjacent passages 81, 82 and 83 is similar to end 12 as shown in FIG. 1B where it functions as a generator. Ambient airstream 90 enters through front stator ducting means 94 into passages 91, 92 and 93, passing in thermal relationship with the adjacent modules functioning as condenser similar to end 12 in FIG. 1B providing heat removal to the ambient.

The modules continue counterclockwise rotation to pre-cooling zone 100 wherein closed loop air from preheating zone 110 is passed through channels 101, 102 and 103 in heat recovery relation to the adjacent modules heating the airstream for closed loop recycle to the preheat zone. The modules are then rotated counterclockwise to the evaporator-adsorber zone and the cycle repeated.

Using the configuration as set forth in FIGS. 5 and 6, a 1-ton cooling capacity unit having modules arranged in rotor form can provide a compact unit with presently available materials.

The thermal input requirements for the apparatus as required by generator stream 86 may be supplied in whole or in part by solar heat sources or any other heat source such as waste heat from any boiler or chemical process source. The generator-condenser zone, shown as 80 in FIG. 5, may be divided into temperature staged heating sub-zones with increasing temperature as the module passes through zone 80. Staged heating provides better utilization of low temperature heat sources such as waste or solar heat. Such lower temperature heat sources may be provided by solar heat, waste heat from another unrelated operation, waste heat from a nuclear reactor, or the like. By simple baffle means in the ducting, the temperature of heating provided by such solar or waste heat source may be utilized directly in the generator-condenser zone. In some cases the available heat source may be sufficient to supply the entire thermal input requirements. In cases when the available heat source is not sufficient to supply the entire thermal input requirements, a higher temperature heater means such as an open flame burner or any other relatively higher temperature heat transfer means may be supplied to a portion of the airstream passing through the generator-condenser zone to provide the necessary final generator temperature. By utilization of the staged heating sub-zones in the generator-condenser zone, the best advantage may be taken of available heat sources and provide the most efficient utilization of necessary additional energy input to obtain required temperatures. This is achieved by raising the temperature of only the final portion of the airstream passing the generator-condenser. Therefore, it is preferred that the baffle means referred to above, be adjustable to direct the necessary portion of the airstream through the higher temperature source and through the generator-condenser zone.

The apparatus of this invention may be used to provide heating to a conditioned room. For such purposes the apparatus as shown in FIGS. 5 and 6 is used as a heat pump by modifying the above description for producing cooling in the following manner: the evaporator section of the evaporator-adsorber zone is in thermal exchange relationship with an ambient airstream while the adsorber section is in thermal exchange relationship with a stream of air circulated from the air conditioned space to be heated, and the condenser section of the condenser-generator zone is in thermal exchange relationship with a stream of air circulated from the air conditioned space to be heated.

When the apparatus functions as a heat pump, the source of heat, referred to above as an ambient airstream, may be obtained from any low temperature waste heat storage, solar heat storage, or the like.

The apparatus of this invention may utilize any suitable materials of construction providing sufficient mechanical strength and thermal transfer properties. Not shown in the figures, but readily apparent to one skilled in the art, are suitable fan means to move the airstreams through the apparatus.

It is seen from the above description that the air conditioning apparatus of this invention may be adjusted by simple ducting adjustments to provide a process for providing cooled air or heated air to a closed space. The process for air conditioning, including both heating and cooling, has the following steps: generating water vapor working fluid desorption from an adsorbent in the interior of a first side of a hermetically sealed module by heating the first side while removing heat from the opposing second side, both of the sides being internally coated with water vapor adsorbent material and thermally insulated from each other, causing the working fluid to adsorb in a condenser function at the second side; then applying heat to the second side while removing heat from the first side causing the working fluid to desorb from the second side and adsorb at the first side functioning as an adsorber, the second side functioning as an evaporator by desorption; and recycling the above thermal conditions in sequence to provide desired conditioning to the enclosed space. When it is desired to provide cooled air to the conditioned space, the airstream to be cooled is passed in thermal exchange relation to the second side while it is functioning as an evaporator. When it is desired to provide heated air to the conditioned space, the airstream to be heated is passed in thermal exchange relation to the first side while it is functioning as an adsorber.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

We claim:

1. In an apparatus for air conditioning, a hermetically sealed module comprising a first and a second spaced, opposing, thermally conductive side, said first and second sides being separated by a thermally insulating material and said space enclosed in sealed relationship, a water vapor adsorbent on the interior of each of said first and second sides, and water vapor within said module in a quantity at least sufficient to fill the adsorptive sites of said adsorbent at one of said sides.

2. The apparatus of claim 1 wherein said hermetically sealed module is evacuated at an absolute pressure of less than about $1 \times 10^{-3}$ mm Hg.

3. The apparatus of claim 1 wherein said first and second sides have extended surfaces on their interior in thermal exchange relation with said sides.

4. The apparatus of claim 3 additionally having extended surfaces on the exterior of said sides and in thermal exchange relation with said sides.

5. The apparatus of claim 4 wherein said interior extended surfaces comprise aluminum honeycomb, the axis of said interior honeycomb at right angles to said sides, and the exterior extended surfaces comprise aluminum honeycomb, the axis of said exterior honeycomb parallel to said side.

6. The apparatus of claim 4 wherein the interior extended surfaces are coated with a water vapor adsorbent selected from the group consisting of lithium chloride, lithium bromide, natural zeolites and molecular sieves.

7. The apparatus of claim 6 wherein the interior extended surfaces are coated with molecular sieves.

8. The apparatus of claim 7 wherein said molecular sieve coating is applied by dipping preconditioned extended surfaces into a suspension of about 2 parts by weight of molecular sieve, 1 part by weight of $Na_2SiO_4$ and about 16 parts by weight of water, the preconditioning obtained by dipping the extended surface into a solution of 2 parts by weight of $Na_2SiO_4$ in about 23 parts by weight of water.

9. An apparatus for air conditioning comprising multiple hermetically sealed modules as defined by claim 1 mounted in spaced relationship forming an airstream passageway between the sides of adjacent modules.

* * * * *